United States Patent [19]
Itskin et al.

[11] Patent Number: 5,604,754
[45] Date of Patent: Feb. 18, 1997

[54] VALIDATING THE SYNCHRONIZATION OF LOCK STEP OPERATED CIRCUITS

[75] Inventors: Randall C. Itskin, Austin; John C. Pescatore, Jr., Georgetown; David B. Ruth, Austin, all of Tex.

[73] Assignee: International Business Machines Corporation, Armonk, N.Y.

[21] Appl. No.: 395,937

[22] Filed: Feb. 27, 1995

[51] Int. Cl.⁶ .............................. G01R 31/28; G06F 11/00
[52] U.S. Cl. .................... 371/47.1; 371/22.3; 395/183.06
[58] Field of Search ................................. 371/47.1, 22.3, 371/22.4, 22.5, 22.6, 3, 67.1; 395/183.06, 183.13

[56] References Cited

U.S. PATENT DOCUMENTS

| | | | |
|---|---|---|---|
| 3,916,380 | 10/1975 | Fletcher et al. | 340/825.04 |
| 4,541,094 | 9/1985 | Stiffler et al. | 371/67.1 |
| 5,331,274 | 7/1994 | Jarwala et al. | 371/22.3 |
| 5,452,443 | 9/1995 | Oyamada et al. | 395/182.08 |
| 5,487,074 | 1/1996 | Sullivan | 371/22.3 |

FOREIGN PATENT DOCUMENTS

88/05572  7/1988  WIPO.

OTHER PUBLICATIONS

IBM TDB, "Using the Residue Function as a Chip to Chip Synchronization Check" vol. 37, No. 7, Jul. 1994, pp. 509–510.

*Primary Examiner*—Robert W. Beausoliel, Jr.
*Assistant Examiner*—Trinh L. Tu
*Attorney, Agent, or Firm*—Casimer K. Salys

[57] ABSTRACT

Apparatus for and methods of detecting an error in multiple state lock step operated circuits. Signatures representing internal states of each circuit are conveyed in daisy chain format to connect successive circuits. Local comparisons between the received signatures and those representing previous internal states are used to detect mismatches between states. Signals indicating the detection of a mismatch appear on a commonly connected error line. Scanned comparison of the circuits to determine those having detected a mismatch allows the error source to be identified.

20 Claims, 5 Drawing Sheets

5,604,754

VALIDATING THE SYNCHRONIZATION OF LOCK STEP OPERATED CIRCUITS

BACKGROUND OF THE INVENTION

The present invention generally relates to the synchronized operation of circuits. More particularly, the invention is directed to the detection of synchronization errors in lock step operated circuits having multiple defined states.

Electronic systems, and in particular computer systems, have evolved to the level where multiple processors operate concurrently on wide and high speed data and address paths. Such systems routinely require that multiple circuits, typically residing on individual integrated circuit chips, maintain a lock step level of synchronized operation through multiple states in clocked succession. Though such systems are designed to maintain synchronization, it is difficult to detect when the circuits diverge. The loss in the lock step ordered operation may be a consequence of device defects, instruction or data errors, or noise induced aberrations in the signals being transmitted within the circuits.

Contemporary wide data path designs frequently partition the data flow into multiple parallel paths using integrated circuit components with matching circuits operable in lock step synchronism with one another. The control structure which coordinates the activities occurring within each of the individual circuits is partitioned analogous to the data flow. In that context, each control partition is given equivalent information for sequencing through the lock step defined states in clocked synchronism with the others. Typically, the control partitions respond in lock step synchronism signals by executing locally defined finite state machine steps. If all the circuits operate properly, each circuit with its associated finite state machine control partition sequences through the same or analogous states as the peer circuits. Though this distributed form of processing data flow provides a means by which the computer system processor and data path count may be increased with relative ease, the architecture is particularly vulnerable to partition errors.

If an error occurs either in the transmission of sequence related signals or as a consequence of a circuit defect, then the control state machine of one circuit may be out of sequence with the peer circuits. Reliable system operation requires that such errors be detected, that the detection be accomplished quickly, and, if feasible, that the source of the error be identified.

The conventional approach to validating the synchronization of multiple states in lock step operated circuits involves the use of a comparator which receives control state signals from the various circuits, compares the states, and identifies mismatches in the states of the various circuits. To be effective in comparing the multiple states in each of the multiple circuits, such comparator require separate lines from each of the circuits with each set being numerically adequate to represent the multiple states of each circuit. Where the circuits reside on individual chips, such lines consume chip input/output pins, a dear commodity for such devices.

If line/pin count is a major concern, it is possible to accomplish the function in a serial format using a scanning or polling scheme. In such practice the comparator information is obtained by scanning or polling each of the circuits individually as to the status of their multiple states. Unfortunately, this approach results in the detection of errors as defined by a comparator output on an average significantly after the state mismatches occur.

What is needed is a system and method which timely detects errors in multiple control partition states of lock step operated circuits without requiring a large bus from each of the circuits to a common comparator.

SUMMARY OF THE INVENTION

The present invention relates to an apparatus which validates synchronization of multiple lock step operated circuits which are independently sequenced through multiple states according to a master clock, and comprises a means for specifying circuit states in the multiple lock step operated circuits, means for a lock step operated circuit to locally compare a circuit state derived therefrom to a circuit state of another lock step operated circuit, means for transmitting circuit state information between lock step operated circuits in a daisy chain format, and means for generating an error signal responsive to a mismatch in one or more means for a lock step operated circuit to locally compare. In another respect, the invention relates to the process by which such apparatus operates. In a further respect, the invention encompasses the determination of which lock step operated circuit malfunctioned by a comparison of the outcomes of the local compare operations in the multiple circuits.

In one form of the invention, each of the multiple circuits subject to lock step operation includes a local comparator which receives and compares local state information with the state information of one adjacent circuit in the daisy chain. With each clock cycle, each circuit conveys a signature representing its state information for the preceding clock cycle to the next adjacent circuit. Each receiving circuit compares the received state information with its local state information from the previous clock cycle. An error line shared by all circuit comparators is used to signal the detection of an error in any one of the circuit comparators. The location of the error can be determined by scanning or polling the succession of circuits if the error information is locally latched upon detection.

These and other features of the invention will be more clearly understood and appreciated upon considering the detailed description which follows.

DESCRIPTION OF THE PREFERRED EMBODIMENT

Figure 1:
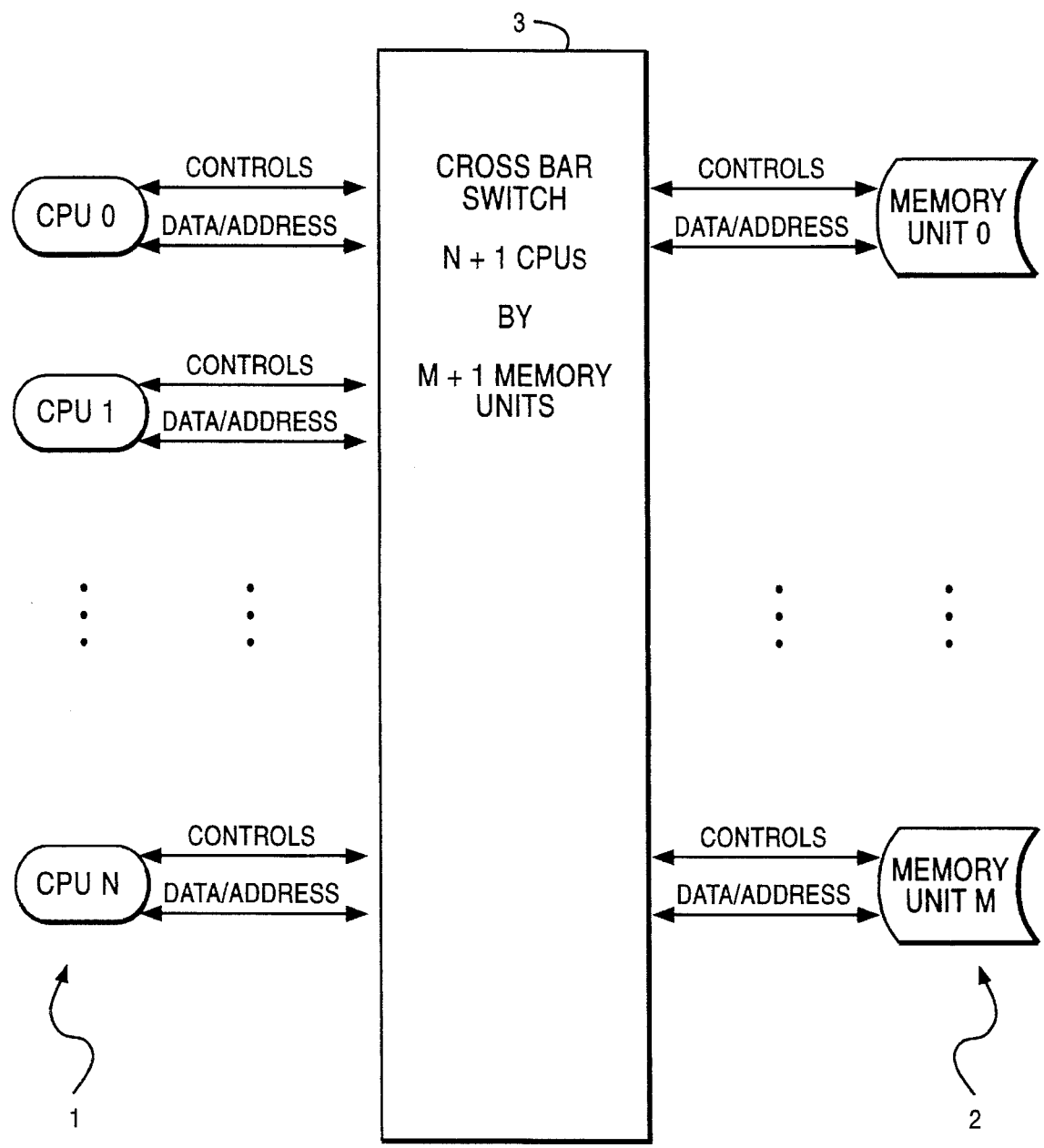
FIG. 1 is a schematic block diagram of a multiple processor system interconnected by a cross bar switch.

FIG. 1 depicts by schematic block diagram a preferred implementation of the invention in the context of a multiple processor system. As shown, a multiplicity of processors (CPU O–CPU N), generally at 1, are connected to a multiplicity of memory units (Memory Unit O-Memory Unit M), generally at 2, through cross bar switch 3. Cross bar switch 3 allows the simultaneous but not contentious connection of any CPU 1 to any Memory Unit 2. As would be expected, the number of data and address lines to be interconnected through the cross bar switch precludes the accomplishment in a single integrated circuit chip. Therefore, the circuits which perform the cross bar switch functions are distributed over multiple integrated circuit chips which are substantially identical. In this context, it is important that the various circuits making up the cross bar switch operate in lock step synchronism as to control state to avoid conflicts in the connections of the CPU and Memory Unit lines.

Figure 2:
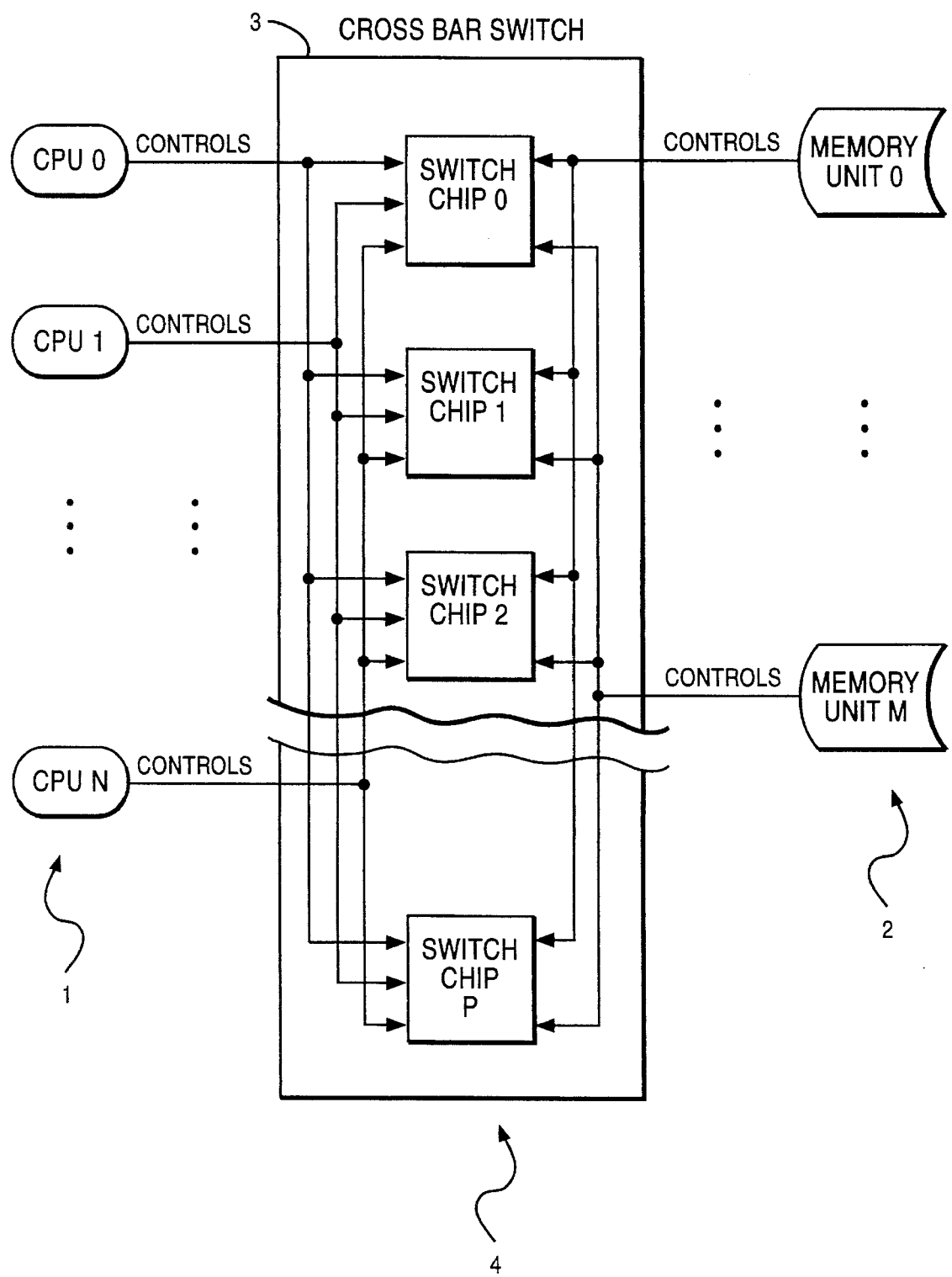
FIG. 2 is a schematic block diagram depicting a cross bar switch interconnection of the multiple processor system.

FIG. 2 depicts in more detail -the elements within cross bar switch 3. As shown, there are a multiplicity of individual switch chips (Switch chip O-Switch chip P), generally at 4, which receive control signals from the CPUs 1 and Memory Units 2 to coordinate the connection of the data and address bus lines (not expressly shown). It is the large number of these bus lines that makes it impractical, if not impossible, to use a single chip to perform the overall cross bar switch function. For example, each CPU will typically have at least 32 address and 64 data lines emanating therefrom, which must be selectively connected to corresponding set of 32 address and 64 data lines of the selected Memory Unit. What is relevant to the present invention is not the internal workings of the individual switch chips, but rather, how errors in the lock step control state operation of the switch chips 4 are detected in an efficient and expedient manner.

Figure 3:
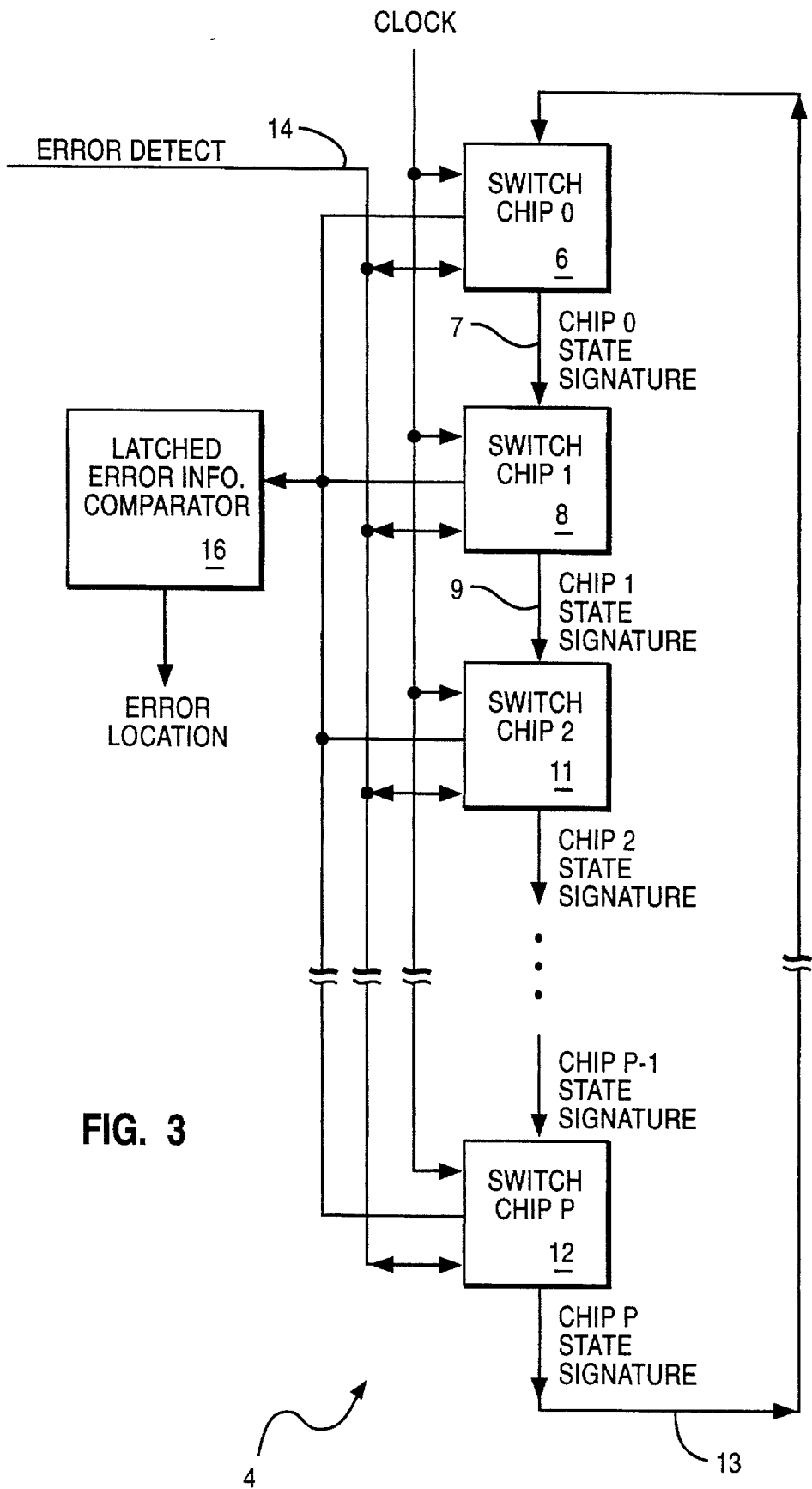
FIG. 3 schematically depicts the daisy chain interconnection of the multiple switch chip circuits in the cross bar switch.

FIG. 3 depicts the daisy chain interconnection of the switch chips 4. As illustrated in FIG. 3, switch chip O, identified by reference numeral 6, provides as an output a chip O state signature on lines 7 which is received as an input by switch chip 1, reference numeral 8. Analogously, switch chip 1, reference numeral 8, provides a chip 1 state signature as an output on lines 9 which is received as an input by switch chip 2, reference numeral 11. The daisy chain format transmission of chip state information concludes with switch chip P, reference numeral 12, which provides as an output the chip P state signature on lines 13 which is received as an input by switch chip O, reference numeral 6. The transmissions are simultaneous within each clock cycle. Each of switch chips O-P is clocked to operate in lock step control state synchronism that matches its peers. Error detect line 14 is common to all the switch chips, thereby serving to broadcast any error detect signal to all the chips.

Switch chips O-P operate in lock step synchronism responsive to the same controlling inputs and corresponding internally generated states. The chip state signatures are bit codes representing a summary of internal states for each chip with each clock cycle. As preferably practiced, a comparator within each switch chip compares the incoming signature with a signature generated for the states of that chip in the immediately preceding clock cycle. Thereby, a full comparison of signatures for all the neighboring chips in the daisy chain ring is delayed by no more than a single clock cycle.

If a local comparison, namely that performed within a switch chip, between a received signature and that of its previous clock cycle detects a mismatch, an error signal is generated on error detect line 14. Normally, the error signal indicates that one of the chip states is out of step. However, it is possible that the error signal is generated by a malfunction in one of the local compare logic circuits. Lastly, it is also possible that a defect has occurred in the signature generation logic or the signature interconnect network.

In another aspect, the present invention allows the system to refine the error information into possible cause or location information. For example, error information generated in the individual switch chips can be scanned or polled and then compared, as by comparator 16 in FIG. 3. If the comparators in two adjacent switch chips designate an error, the error location can be attributed to the switch chip at the top of the chain. An error in a single switch chip suggests defective logic in that chip. Furthermore, if the comparison of the error information indicates that the local comparators in more than two switch chips have signalled a mismatch, the results strongly suggest interconnect defects.

Figure 4:
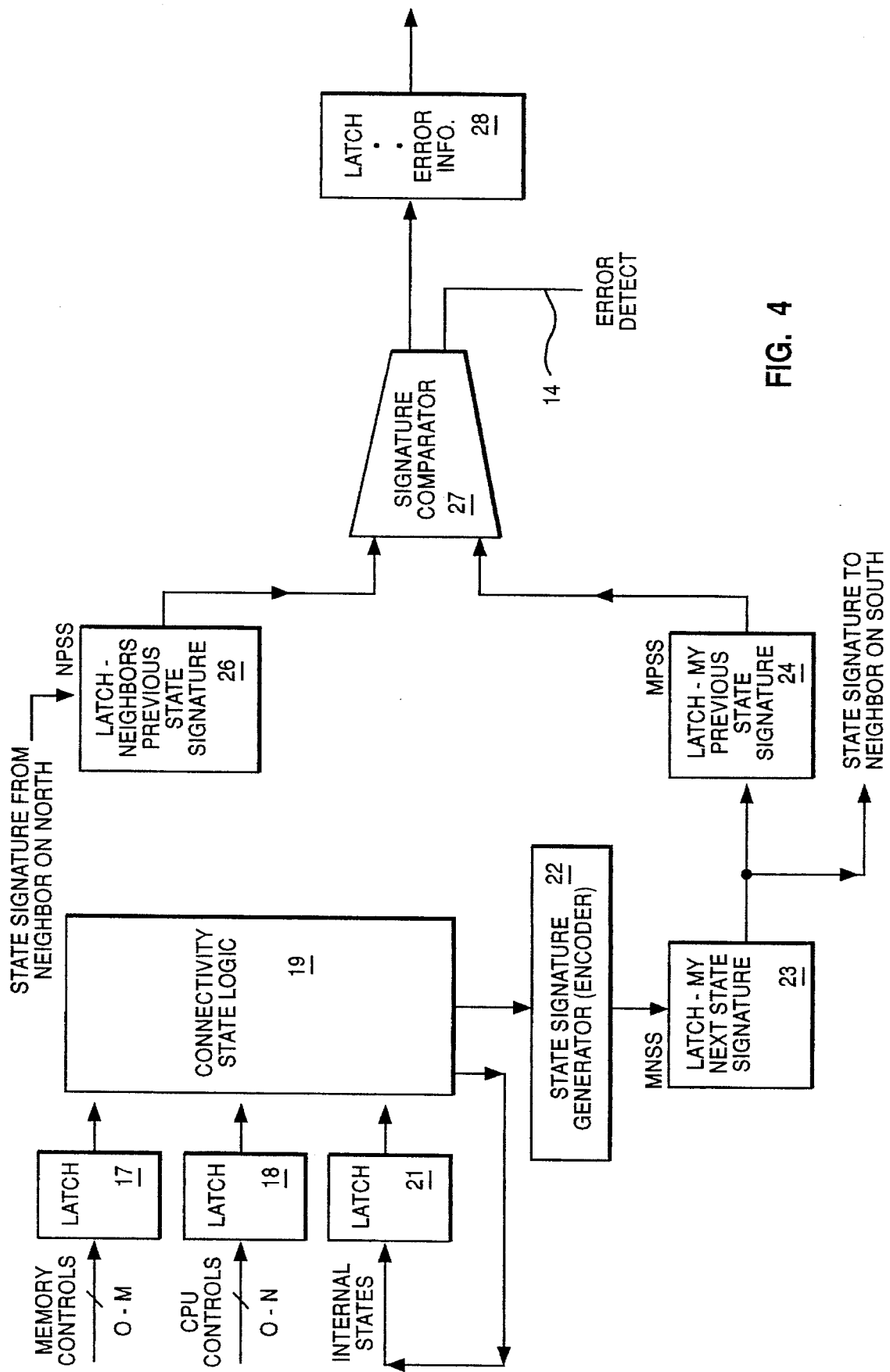
FIG. 4 schematically depicts by block diagram the functional elements in each chip which provide the features of the present invention.

FIG. 4 depicts in greater detail the functional elements that generate the circuit state signatures, the latches which receive and transmit state signature information, and the local signature comparator which generates the error signal upon detection of a mismatch of selected state signatures. The daisy chain format interconnect of the state signatures between adjacent circuits is clearly shown. As preferably embodied, each switch chip depicted in FIG. 3 includes the elements of FIG. 4. The interconnection is the aforementioned daisy chain format of state signature passing and common connection of the error detect line.

FIG. 4 illustrates that memory control line O–M and CPU control line O–N are respectively stored in latches 17 and 18. Connectivity state logic 19 generates the finite state machine or equivalent internal states of the switch chip for each clock cycle, which is typically stored in latches such as 21. The state information, representing the status within the switch chip, is conveyed to state signature generator 22 for encoding into efficient bit count format. An example would involve the use of the conventional error correction code (ECC) formats. The state signature generated in block 22 is then provided as a latched output, from latch 23, to the next adjacent switch chip circuit, in this case the neighbor to the south. Latch 24 holds the state signature for the switch chip as generated in the previous clock cycle. Coincident with the generation of the state signature by block 22, the previous cycle state signature from the neighbor on the north is received in latch 26 and compared with the previous state signature of the local switch chip in signature comparator 27. A mismatch in the comparison causes the generation of an error signal on common line 14. Latch 28 stores the error information as uniquely generated in signature comparator 27 for future polling or scanned analysis in the manner described hereinbefore.

A number of things should be noted from the depiction in FIG. 4. First, the comparisons are done locally as opposed to being performed in a central comparison unit, thereby avoiding the need for independent lines from each switch chip. Furthermore, note the use of a single error detection line by all the switch chips. Also, note that the error detection is accomplished no more than one clock cycle after the error occurs. Lastly, note that the apparatus and methods provide a degree of error location differentiation through a relatively simple evaluation of latched error information.

Figure 5:
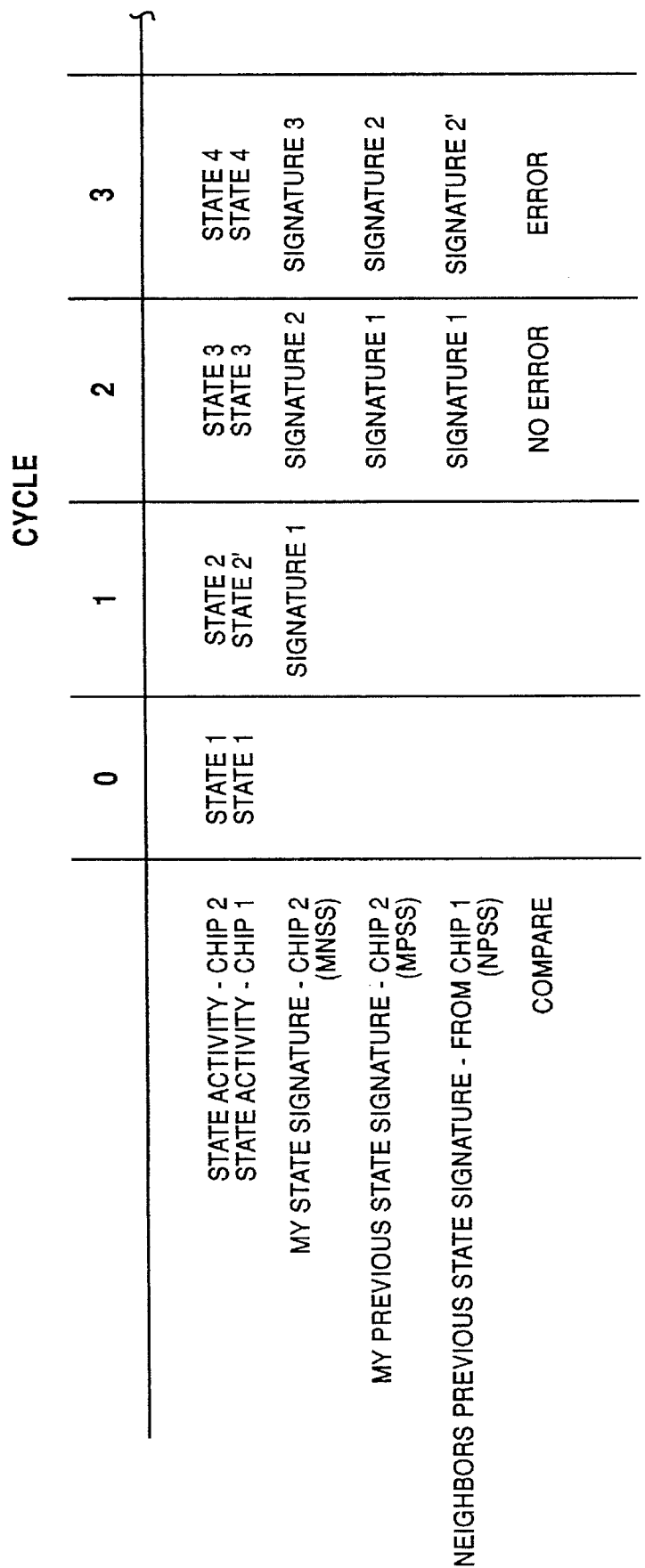
FIG. 5 schematically depicts by timing relationship the comparison of states within successive chip circuits.

FIG. 5 schematically illustrates by a timing diagram related to clock cycles an example of state activity, signature activity and error detection as might occur in the use of the present invention. In this regard, note that at cycle O, both chips 1 and 2 are in lock step matched state 1. However, during cycle 1, though chip 2 is in the appropriate state 2, a chip 1 malfunction has caused the generation of a state 2'. Continuing, during cycle 2 the comparator within chip 2 detects no error because of the match between the previous state of chip 1 and the internal previous state of chip 2, namely both are signature 1. However, upon the onset of cycle 3, one cycle removed from the error which occurred in cycle 1, the comparison in chip 2 identifies that there is a mismatch between its previous signature, namely signature 2, and the previous state signature generated within chip 1, namely signature 2'. Timing diagram in FIG. 5 confirms the efficacy of the invention in timely detecting state inconsistencies.

Though the use of the invention has been described in the context of a computer system cross bar switch having multiple lock step operated switch chips, the concepts are fully applicable to any group of independent multiple state clocked circuits which exhibit lock step operation. The invention minimizes the number of interconnect lines dedicated to comparison operation while substantially eliminating delays in the detection of errors. Furthermore, as described herein, the arrangement provides for readily identifying the classification or location of detected errors. All these features are important in contemporary parallel architecture designs.

Though the invention has been described and illustrated by way of a specific embodiment, the apparatus and methods encompassed by the invention should be interpreted to be in keeping with the breadth of the claims set forth hereinafter.

We claim:

1. In an electronic system having multiple lock step operated circuits, apparatus to validate synchronization of the circuits, comprising:

means for specifying circuit state information in three or more synchronized lock step operated circuits;

means for transmitting circuit state information along a daisy chain connection of the lock step operated circuits;

means in a first lock step operated circuit for comparing circuit state information derived within the first lock step operated circuit to circuit state information transmitted from a next successive lock step operated circuit along the daisy chain; and means for generating an error signal responsive to a mismatch detected during a comparison performed in the first lock step operated circuit.

2. The apparatus recited in claim 1, wherein the means for transmitting circuit state information provides resources for simultaneously transmitting circuit state information between successive lock step operated circuits in the daisy chain.

3. The apparatus recited in claim 2, wherein the means for comparing circuit state information compares with circuit states from a previous clock cycle.

4. The apparatus recited in claim 3, wherein the means for comparing circuit state information compares next successive lock step operated circuit state information to first lock step operated circuit state information delayed by a clock cycle.

5. The apparatus recited in claim 4, wherein the error signal is transmitted on an error line common to the three or more lock step operated circuits.

6. The apparatus recited in claim 1, further comprising:

means for determining which lock step operated circuit generated an error signal.

7. In a computer system having multiple processors, multiple memories and three or more synchronized lock step operated interconnect circuits interconnecting the processors and memories, apparatus to validate synchronization of the interconnected circuits, comprising:

means for specifying circuit state information in the three or more synchronized lock step operated interconnect circuits;

means for transmitting interconnect circuit state information along a daisy chain connection of the lock step operated interconnect circuits;

means in a first lock step operated interconnect circuit for comparing interconnect circuit state information derived within the first lock step operated circuit to circuit state information transmitted from a next successive lock step operated interconnect circuit along the daisy chain; and means for generating an error signal responsive to a mismatch detected during a comparison performed in the first lock step operated interconnect circuit.

8. The apparatus recited in claim 7, wherein the means for transmitting interconnect circuit state information provides resources for simultaneously transmitting interconnect circuit state information between successive lock step operated interconnect circuits in the daisy chain.

9. The apparatus recited in claim 8, wherein the means for comparing interconnect circuit state information compares with interconnect circuit states from a previous clock cycle.

10. The apparatus recited in claim 9, wherein the means for comparing interconnect circuit state information compares next successive lock step operated interconnect circuit state information to first lock step operated interconnect circuit state information delayed by a clock cycle.

11. The apparatus recited in claim 10, wherein the interconnect circuits comprise a cross bar switch.

12. The apparatus recited in claim 11, wherein the error signal is transmitted on an error line common to the three or more lock step operated interconnect circuits.

13. The apparatus recited in claim 11, further comprising:

means for determining which lock step operated interconnect circuit generated an error signal.

14. The apparatus recited in claim 7, further comprising:

means for determining which lock step operated interconnect circuit generated an error signal.

15. In an electronic apparatus having multiple synchronized lock step operated circuits, a method of validating synchronization of the circuits, comprising the steps of:

specifying circuit state information in three or more synchronized lock operated circuits;

transmitting circuit state information along a daisy chain connection of the lock step operated circuits;

comparing, in a first lock step operated circuit, circuit state information derived within the first lock step operated circuit to circuit state information transmitted from a next successive lock step operated circuit along the daisy chain; and generating an error signal responsive to a mismatch detected during a comparison performed in a first lock step operated circuit.

16. The method recited in claim 15, wherein the step of transmitting circuit state information provides resources for simultaneously transmitting circuit state information between successive lock step operated circuits in the daisy chain.

17. The method recited in claim 16, wherein the step of comparing involves comparisons of circuit state information with circuit states from a previous clock cycle.

18. The method recited in claim 17, wherein the step of comparing circuit state information compares next successive lock step operated circuit state information to first lock step operated circuit state information delayed by a clock cycle.

19. The method recited in claim 18, wherein the error signal is transmitted on an error line common to the three or more lock step operated circuits.

20. The method recited in claim 15, further comprising the step of:

determining which lock step operated circuit generated an error signal.

* * * * *